United States Patent
Ghanea-Hercock

(10) Patent No.: US 9,325,679 B2
(45) Date of Patent: Apr. 26, 2016

(54) METHOD AND APPARATUS FOR COMMUNICATING INFORMATION BETWEEN DEVICES

(75) Inventor: Robert A Ghanea-Hercock, Ipswich (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 1897 days.

(21) Appl. No.: 11/887,275

(22) PCT Filed: Mar. 2, 2006

(86) PCT No.: PCT/GB2006/000734
§ 371 (c)(1),
(2), (4) Date: Sep. 27, 2007

(87) PCT Pub. No.: WO2006/103386
PCT Pub. Date: Oct. 5, 2006

(65) Prior Publication Data
US 2009/0254977 A1    Oct. 8, 2009

(30) Foreign Application Priority Data
Mar. 31, 2005  (EP) ..................................... 05252020

(51) Int. Cl.
*H04L 29/06*   (2006.01)

(52) U.S. Cl.
CPC .............. *H04L 63/08* (2013.01); *H04L 63/102* (2013.01)

(58) Field of Classification Search
CPC .............................. H04L 63/08; H04L 63/102
USPC .............. 726/1, 4, 11, 22; 713/153, 168, 193; 709/201, 223
See application file for complete search history.

(56) References Cited

U.S. PATENT DOCUMENTS 6,317,838 B1 *  11/2001  Baize .............................. 726/11
7,047,406 B2 *   5/2006  Schleicher et al. ........... 713/168

(Continued)

FOREIGN PATENT DOCUMENTS

WO     WO 03084168 A1     1/2003

OTHER PUBLICATIONS

Tanenbaum, Andrew S. "Network protocols." ACM Computing Surveys (CSUR) 13.4 (1981): 453-489.*

(Continued)

*Primary Examiner* — Kari Schmidt
(74) *Attorney, Agent, or Firm* — Nixon & Vanderhye P.C.

(57) ABSTRACT

A network of devices permits data to be stored on the devices and subsequently searched and accessed from any other one of the devices. A plurality of channels are defined to distribute a plurality of access points throughout the network. A mechanism securely assigns authorizations to users to read or write from or to specified ones of the channels, which authorizations are capable of being checked by each of the access points. To write into a channel, a request is made to one of the access points which checks if the requesting user is authorized to write onto the requested channel. If appropriate, the data is associated with the requested channel. To search for data from a particular channel or group of channels, a search request is made to one of the access points which first checks the requesting user is authorized to read from the requested channel or group of channels. If appropriate it issues a corresponding search request or requests to a subset of the devices which checks to see if stored data satisfying the request exists there and, if so, the data is transmitted to the requesting user. Otherwise the search request is forwarded to another one or more of the devices.

11 Claims, 5 Drawing Sheets

(56) References Cited

U.S. PATENT DOCUMENTS

| | | | |
|---|---|---|---|
| 7,225,342 B2* | 5/2007 | Takao et al. | 713/193 |
| 7,379,428 B2* | 5/2008 | Xu et al. | 370/254 |
| 7,774,451 B1* | 8/2010 | Bogorad et al. | 709/223 |
| 8,015,211 B2* | 9/2011 | Marceau et al. | 707/802 |
| 8,176,189 B2* | 5/2012 | Traversat et al. | 709/230 |
| 2002/0194108 A1* | 12/2002 | Kitze | 705/37 |
| 2003/0028585 A1* | 2/2003 | Yeager et al. | 709/201 |
| 2003/0105812 A1 | 6/2003 | Flowers, Jr. et al. | |
| 2003/0120928 A1* | 6/2003 | Cato et al. | 713/176 |
| 2003/0159070 A1* | 8/2003 | Mayer et al. | 713/201 |
| 2003/0163697 A1 | 8/2003 | Pabla et al. | |
| 2004/0003247 A1 | 1/2004 | Fraser et al. | |
| 2004/0088347 A1 | 5/2004 | Chen et al. | |
| 2004/0122958 A1* | 6/2004 | Wardrop | 709/229 |
| 2004/0153642 A1* | 8/2004 | Plotkin et al. | 713/150 |

OTHER PUBLICATIONS

Venugopal, Srikumar, Rajkumar Buyya, and Kotagiri Ramamohanarao. "A taxonomy of data grids for distributed data sharing, management, and processing." ACM Computing Surveys (CSUR) 38.1 (2006): 3.*

Bertino, Elisa, and Ravi Sandhu. "Database security-concepts, approaches, and challenges." Dependable and Secure Computing, IEEE Transactions on 2.1 (2005): 2-19.*

Berket K et al.: "PKI-based security for peer-to-peer information sharing," Peer-to-Peer Computing, 2004. Proceedings, Fourth International Conference on Zurich, Switzerland, Aug. 2004, pp. 45-52.

PCT International Search Report mailed Aug. 5, 2006.

Berket K. et al., "PKI-Based Security for Peer-to-Peer Information Sharing," Proceedings of the Fourth International Conference on Peer-to-Peer Computing (P2P'04), Zurich, Switzerland Aug. 25-27, 2004, Piscataway, NJ, USA, IEEE, Aug. 25, 2004, pp. 45-52, XP010724966.

Seleznyov, A., et al., "Adam: An Agent-Based Middleware Architecture for Distributed Access Control," In Proceedings of the Twenty-Second International Multi-Conference on Applied Informatics: Artificial Intelligence and Applications, pp. 200-205, Innsbruck, Austria, 2004. IASTED, Acta Press.

Extended European Search Report dated Oct. 12, 2005 in EP 05252020.2.

International Search Report dated Apr. 26, 2006 in PCT/GB2006/000734.

* cited by examiner

METHOD AND APPARATUS FOR COMMUNICATING INFORMATION BETWEEN DEVICES

This application is the U.S. national phase of International Application No. PCT/GB2006/000734 filed 2 Mar. 2006 which designated the U.S. and claims priority to EP05252020.2 filed 31 Mar. 2005, the entire contents of each of which are hereby incorporated by reference.

TECHNICAL FIELD

The present invention relates to a method and apparatus for communicating information between devices. In particular, it relates to a method and apparatus for permitting a large number of users to share information in a secure manner over an interconnected network or internetwork in such a manner that access to different pieces of information by different users can be easily yet securely controlled.

BACKGROUND TO THE INVENTION

There is a recognised need to enable large organisations to allow controlled access to information stored on their computer networks in a flexible manner such that different sets of users are permitted to access different types of information contained on the network. At present, organisations tend to have very general coarse grain controls, or very specific controls over their data. For example, most organisations will implement a firewall which prevents external parties from accessing data stored within the firewall; this is a very coarse grain control since, in general, if you are "outside" the firewall you can see none of the data inside the firewall, and if you are "inside" you can see all of it. Additionally, or instead of this, organisations may have various servers which store files that only certain specified persons may access. In this way certain groups of employees of the organisation may have a common space where they can share documents amongst one another. However this solution is fairly specific. Each individual needs to be individually specified as being allowed access to the documents contained in the shared space. Furthermore, the data is all stored at a single central location (e.g. on a single server or distributed amongst a plurality of servers operating together as a single storage unit, etc.).

There is a growing interest in the concept of Peer to Peer (P2P) networks, (also referred to as overlay networks in certain contexts). The use of a P2P architecture provides a number of useful features e.g. resilience to attack, flexible deployment, low administrative overhead costs and access to resources at the edge of networks. However, in most implementations they suffer from three forms of security weakness.

i. The first security problem is the ability of P2P networks to open holes in Firewalls and enable access to intranet environments.
ii. The second problem is that P2P networks provide no (or minimal) means of filtering or restricting access to specific data sets or objects that have been added to the network.
iii. They tend to be used by very loosely bound groups of individuals and lack the protocols and structure necessary for enterprise management.

The present invention is primarily concerned with the second of these issues.

The following is a brief overview of the main types of P2P network currently in use. Current P2P systems can be classified into structured and unstructured systems according to the ways in which peer associations are constructed (Lv et al., 2002). Structured systems such as Freenet (Clarke, I. and Sandberg, O. 2000), Chord (Stoica et al, 2002), Pastry (Rowstron A. and Druschel P., 2001), Tapestry (Zhao et al, 2003), and P-Grid (Aberer et al, 2003) have pre-defined network topologies and resource placement schemes. Peers in these systems are assigned static identifiers and routing tables based on identity distances which are distributed onto some if not all of the peers.

In structured P2P systems peers are well organised and resource search is relatively straightforward, but substantial knowledge and experience are required for system design and this is always at a cost of increased maintenance to deal with various changes caused by peers/resources joining and leaving. Meanwhile, pre-defined network topologies in structured P2P systems usually restrict the choice of applicable search protocols and applications of the systems to only those that satisfy certain design requirements.

In unstructured systems relationships between peers are arranged and modified in a dynamic manner using simple heuristics.

A large number of open-source P2P networks and access software exist, for example Gnutella, Kazaa, and Limewire. Relatively fewer commercial implementations exist, which is primarily due to the stated security issues in applying this technology in a commercial environment. Some of the available examples of commercial products include:

i. Groove networks. This is the closest technical implementation of a P2P network architecture that includes a degree of security. The main security features are the use of strong encryption for all data in the network and the concept of invited user groups within which data can be securely shared and not be visible to other users of the Groove network (http://www.groove.net).
ii. Adaptinet. This is a simple commercial P2P system for data transfer. See their website currently available at http://www.adaptinet.com/ for details of this product.

SUMMARY OF THE INVENTION

According to a first aspect of the present invention, there is provided a method of operating a network of devices to permit data to be stored on the devices and subsequently to be searched for and accessed from any other device on the network, the method comprising: defining a plurality of channels; distributing a plurality of access points throughout the network; and providing a mechanism for securely assigning authorisations to users to read or write data from or to specified ones of the channels, which authorisations are capable of being checked by each of the access points; wherein in order to write data into a channel, a request is made to one of the access points which first checks the appropriateness of the request by checking that the user making the request is authorised to write data onto the requested channel and, if appropriate, it associates the data with a tag specifying that the data has been added to the requested channel; and wherein in order to search for data from a particular channel or group of channels, a search request is made to one of the access points which first checks the appropriateness of the request by checking that the user making the request is authorised to read data from the requested channel or group of channels and, if appropriate it issues corresponding search requests to a subset of the devices which check if they are storing data satisfying the request and if so transmitting the data to the requesting user, but otherwise forwarding on the search request to other ones of the devices.

According to a second aspect of the present invention, there is provided a data storage system for permitting data to be stored and selectively accessed by users of the system, the system comprising a computer network including a plurality of data processing devices connected to the network, at least some of the devices, when in use, supporting access point software modules each of which is operable to control access, by users of the system, to the system, such that prior to permitting a user to retrieve data from, or to write data to, the system it can check the identity of the user and determine from which categories of data the user can read data or to which categories of data the user caIn write data, and wherein each access point is further operable, in response to a request by the user to write data to the system and to associate it with a particular category, to check that the user is authorised to write data belonging to that category to the system and if so, to generate an association with the requested category and to cause one of the devices connected to the network to store the data together with the association, and wherein each access point is further operable, in response to a request by the user to access data from the system (either from a specified one or more categories or, where no categories have been specified, from any permissible category), to check that the user is authorised to read data associated with the or each respective category and if so to search for the requested data from the device on which the access point software module is operating and any other associated devices, and if the data can not be found, passing the request on to one or more other ones of the software agents for them to search for the requested data.

It will be apparent to the reader that in as much as each device on the network as set out above is able to initiate requests to the network (of devices) (e.g. to store or retrieve documents) as well as to receive, process and respond to requests (from access points directly, although these are ultimately initiated by other devices) that these devices are behaving as peers in a peer-to-peer network rather than as clients in a client-server network.

By using access points to control access to a number of channels overlaid onto a peer to peer network, a system is realised which enables all of the advantages of a peer to peer network to be realised whilst at the same time permitting the system to be secure in a flexible manner. Thus, the method and system of the present invention provides the following advantages: it is possible to enforce tight policy control over access to data by individuals and services; individuals can subscribe to specific channels (if permitted); it enables the advantageous approach of assuming a "dumb network" (i.e. intelligence is reserved for the end-points, hence any underlying network can be used for transport); it allows for the creation of flexible "Chinese Walls" within an organisation's network; it maps easily onto existing Peer to Peer (P2P) systems; it enables the creation of a very flexible and yet secure network infrastructure—in particular, a security breach in one channel will not propagate to other channels, thus limiting the damage caused; it enables variable levels of transparency to be achieved for globally advertised data (i.e. posted data objects are visible according to the degree of authorisation held by each user); and it maps well onto known processes used in the construction of human social networks, and therefore the system is intuitive and natural for users to use.

Preferably the access points are provided by distributed autonomous software agents (for example as are able to be generated using the Zeus autonomous agent tool set—a well known publicly available tool set—or using the JADE agent tool set—another well known publicly available tool set).

By setting a client application associated with a particular user to automatically request all documents belonging to a particular category or "channel" it is possible to operate the system as an announcement system in which any data published to such a channel is automatically broadcast to all subscribing users.

Preferably, the access points (especially where they are formed by autonomous software agents) may operate a distributed authentication procedure such as that described in co-pending International Patent application with Publication No. WO 03/084168. Preferably, category or channel associations are made using XML documents generated, structured, processed and passed between software agents in accordance with an XML document exchange protocol (which may either be a sui generis protocol or may be an extension of a standard protocol such as the Security Assertion Mark-up Language (SAML) protocol). Furthermore, information about an individual user is also preferably passed between software agents using a similar XML document protocol. Preferably data in the form of electronic documents are also encrypted and passed between devices in the form of XML documents using a similar XML protocol.

Other aspects of the present invention include computer programs for implementing the methods and systems of the present invention and carrier mediums carrying such programs.

BRIEF DESCRIPTION OF THE FIGURES

In order that the present invention may be better understood, embodiments thereof will now be described, by way of example only, with reference to the accompanying drawings in which.

FIRST EMBODIMENT

Figure 1:
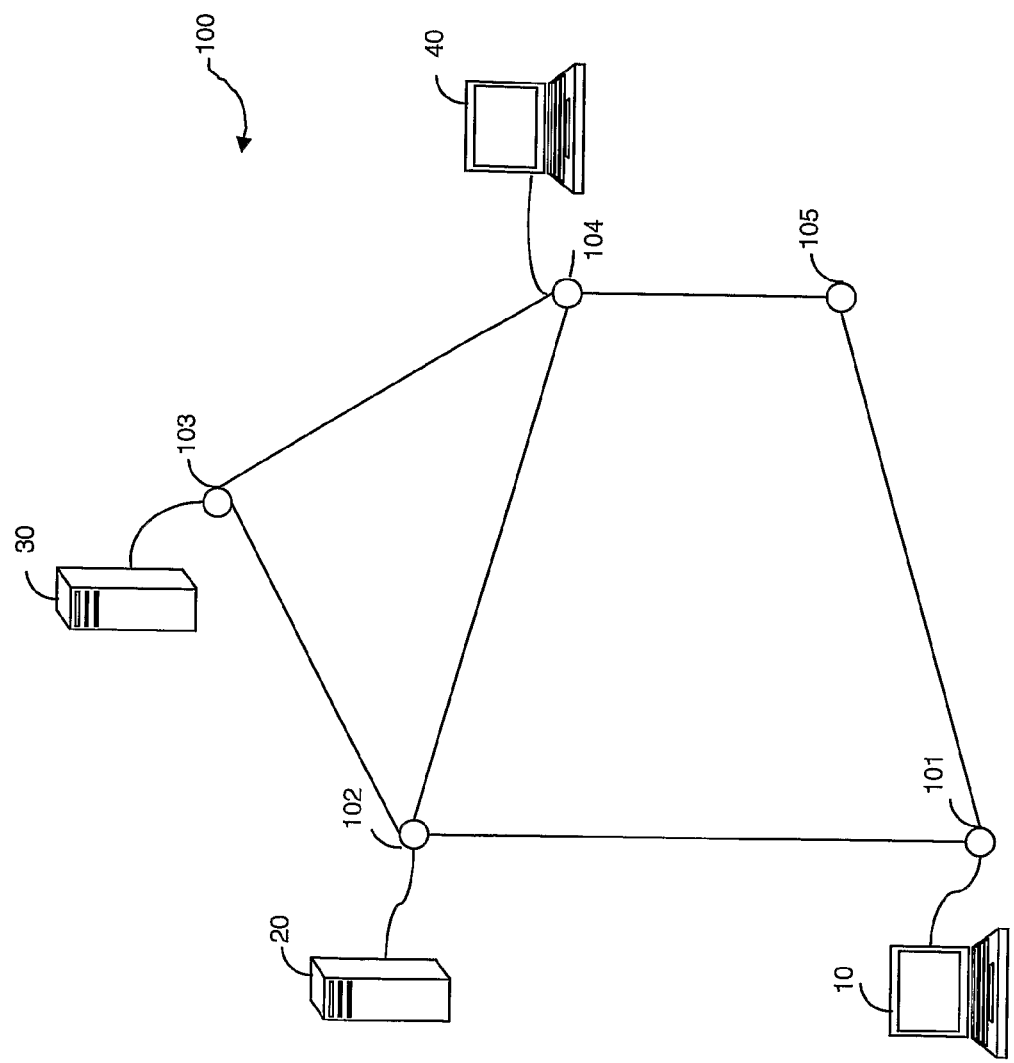
FIG. 1 is a schematic overview of a peer to peer network suitable for use in a first embodiment of the present invention.

The peer to peer network of FIG. 1 is a fairly standard one which, in this particular case, is formed using the JXTA toolset for generating peer to peer (P2P) networks. There are in fact a large number of different mechanisms for forming P2P networks, most of which do not actually form true P2P networks in the sense that at any one time, one device is normally acting as a server whilst one or more others are acting as clients, however, this is frequently due to the nature of underlying protocols used for transmitting information across whatever underlying network is being used to connect the devices together. This, level of detail of the operation of P2P networks is not highly relevant to the present invention and will not be discussed here in greater detail. For further details about the operation of P2P networks and P2P networks built using JXTA in particular, the reader is referred to any one of numerous text books or introductory papers on the subject such as, for example, the paper currently available online at http://ntrg.cs.tcd.ie/undergrad/4ba2.02-03/p9.html, or the discussions contained in the web site for JXTA itself, currently available at http://www.jxta.org.

Thus, in FIG. 1 the P2P network is seen to comprise a number of nodes 101-105. Each of these nodes has some computing resources associated with it. These may vary enormously from one node to another. For example, in FIG. 1, node 101 is illustrated as having a laptop computer 10 associated with it, whereas node 102 is illustrated as having a server computer 20 associated with it. Similarly, nodes 103 and 104 are illustrated as having associated with them respectively a server computer 30 and a lap-top computer 40. Note that one of the benefits of JXTA is that it is well suited to forming P2P networks comprising a diverse range of heterogeneous devices including, for example computers (of all sorts) and small mobile devices such as Personal Digital Assistants (PDA's) and reasonably sophisticated mobile phones, etc.

In the embodiment illustrated in FIG. 1, some of the devices 20, 30 (all of which form nodes within the P2P network) have access point software modules running on them which behave as an overlay network sitting on top of the P2P network to control access to the P2P network by users. Thus if a user of device 10 wishes to search for a document stored on the P2P network, the user first establishes a connection (e.g. a TCP/IP connection) with an access point (e.g. one running on server 20) and sends an appropriate search request to the access point. The access point then launches the search on the P2P network on behalf of the user and forwards on any results to the user. In addition, the access point performs some authentication and authorisation of the user and presents to the user a number of overlaid "channels". In this embodiment the overlaid channels are completely transparent to the underlying P2P network, but give useful structure to the users and the system administrator, as will be explained in greater detail below.

Continuing with the example started above, suppose the user of device 10 wishes to locate a document with the title "Badgerman bites back" which the user of device 10 has written to the "General" channel (a channel from and to which, in this embodiment, all users of the system are able to read and write) and which (i.e. the document) is currently physically stored on server 30 in an encrypted form. Firstly, a connection is set up between the laptop 10 and the server 20. The user is authenticated by the access point and the user then requests the document by its title. The access point (after determining on which channels to search for the document) issues' the resulting request (or requests) onto the P2P network. In the present example, this involves passing the request to node 102 (which is simply a software module also running on server 20). The node 102 initially searches its local resources (i.e. the memory associated with server 20) for the document, discovers that it does not have a copy of the document stored locally and therefore forwards the request on to other nodes in the P2P network in the normal manner of operation of P2P networks. This results in node 103 receiving the request (as well as nodes 104 and 105) which discovers that server 30 is storing the requested document and informs the access point running on server 20 that it has the requested document. The access point forwards on the information about the document found as a result of the search to the device 10 which, may then ask for the actual found document to be passed to it, in which case the access point asks for the document directly from the node 103. Having received it, the access point decrypts the document and removes associated meta-data (including the General channel association) and forwards the requested document to the user.

Figure 2:
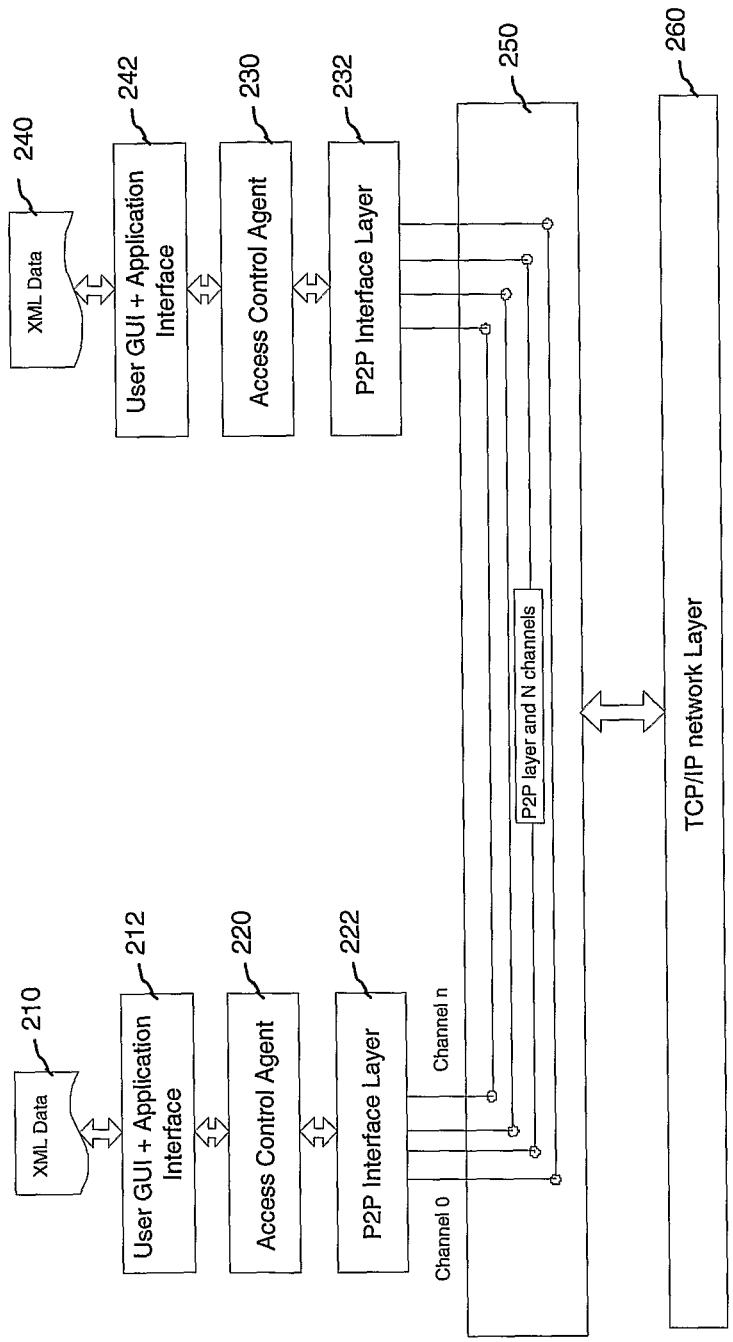
FIG. 2 is a schematic illustration of the functional layers through which data is passed to communicate data from one node to another in the peer to peer network of FIG. 1.

Referring to FIG. 2, the different functional processing layers through which data passes when using the embodiment of FIG. 1 either to write data to the system or retrieve data from the system will now be described. In particular, there will now be discussed, with reference to FIG. 2, the layers through which data passes and, with additional reference to FIG. 3, the various steps taken when laptop 40 writes a document onto the system and, with additional reference to FIG. 4, the steps taken when laptop 10 retrieves a document from the system.

Figure 3:
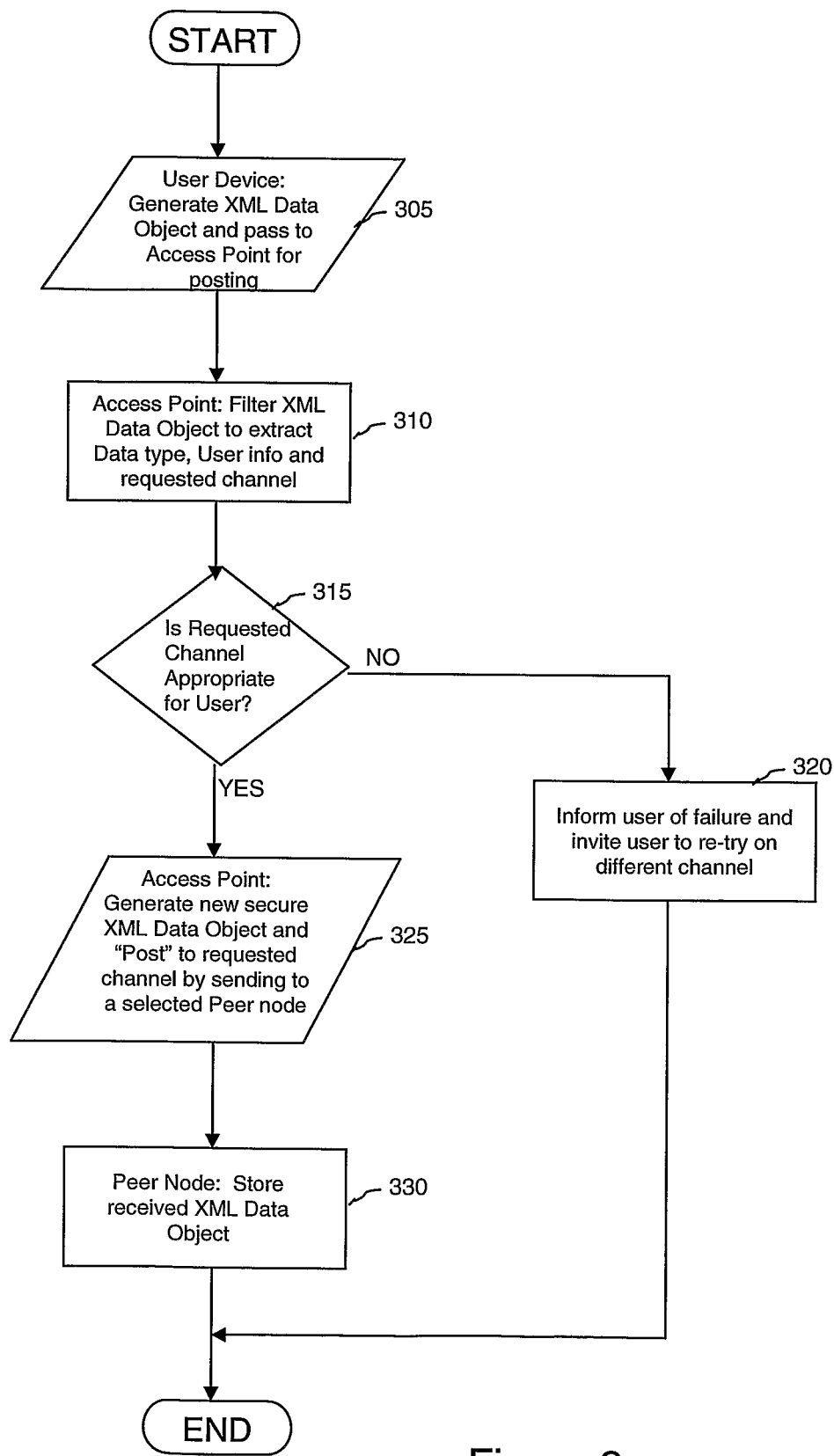
FIG. 3 is a flowchart illustrating the steps required to post new data onto the peer to peer network of FIG. 1.

When the user of laptop 40 wishes to write some data 240, which, in this example, is already in the form of a text file containing an XML document, the data is passed to the "user Graphical User Interface (GUI) and Application Interface (AI)" 242 running on the laptop 40. The user additionally informs the user GUI and AI as to the desired channel onto which the user would like the data to be written. The user GUI and AI 242 processes the data to include meta-information (i.e. information about the data item and the person attempting to write or post the information), contacts the Access Control Agent (ACA) 230 running on server computer 30 and transmits the processed XML data to the ACA 230 for further processing. This initial processing is shown in FIG. 3 as step 305 (which is performed by the user device 40).

In the present embodiment, the meta-information added to the input XML document by the user GUI and AI 242 includes an identification of the user, a title for the document, a timestamp and serial number to identify the document uniquely, an indication that the user wishes to write this document to the system and an indication of the user selected channel.

When the ACA 230 receives the processed XML document, it reads the XML document to establish the identity of the user and the requested channel into which the user wishes to write the document (note that in this embodiment the identity of the user is trusted as being accurate; however, in alternative embodiments, some sort of authentication process could be carried out between the access point and the user of the laptop 10, such as, for example, that described in co-pending patent application with Publication No. WO 03/084168). It then checks that the user is authorised to write data into the requested channel. In the present embodiment, this is done by the ACA 230/access point consulting a locally cached copy of a table of all users of the system together with their current authorisations (however, in alternative embodiments a centrally located table could be consulted instead, or the table itself could be stored in a distributed manner with each access point locally storing only a portion of the complete table—preferably in such a way that the portion of the table most frequently consulted by each access point is stored locally to that access point, etc.). This is illustrated in FIG. 3 by steps 310 and decision step 315. In the event that the ACA 230 determines that the user is not in fact authorised to write data onto the requested channel, then at step 320 the ACA sends a failure message back to the user GUI and AI 242 which, in the present embodiment, invites the user to try again but on a different channel.

If the ACA 230 determines that the user is authorised to write data to the requested channel it forwards the data on to a P2P interface layer 232 which also forms part of the access point running on server 30 in the present embodiment. Also, in the present embodiment, before passing the document to the P2P interface layer 232 it encrypts the information corresponding to the original information posted by the user so that it is not readable except via an access point (which is able to decrypt all such encrypted documents). The P2P interface layer then passes the resulting XML document to the underlying P2P network with a request that the document be stored on an appropriate node of the P2P network. The operation of the P2P network to identify a suitable node on which to store the information is, in the present embodiment, conventional and will not therefore be described. These steps are illustrated in FIG. 3 by step 325. Step 330 illustrates a peer node finally storing the XML document, at which point the method illustrated in FIG. 3 ends.

Note, as an alternative to having the access point perform encryption and decryption of the user provided data, facilities provided by the P2P network could be used instead to ensure some level of protection against unauthorised reading of documents by unauthorised third parties, or both methods could be employed together to provide extra levels of security.

The P2P network layer is illustrated in FIG. 2 as the multi-layered P2P network and N channels layer 250. It is important to note that in the present embodiment, the channels are virtual in the sense that as far as the P2P network is concerned, there is only one "channel" as is the case in a conventional P2P network as is used in the present embodiment. However, since each document is stored as an XML document which includes an association to a particular channel (and/or sub-channel) it is as if there were multiple channels provided by the P2P network as illustrated in FIG. 2. Finally, FIG. 2 shows a TCP/IP network layer underpinning the whole system since, in this embodiment, all communications between remote devices are performed using TCP/IP connections (and preferably using Secure Sockets Layer (SSL) connections).

Figure 4:
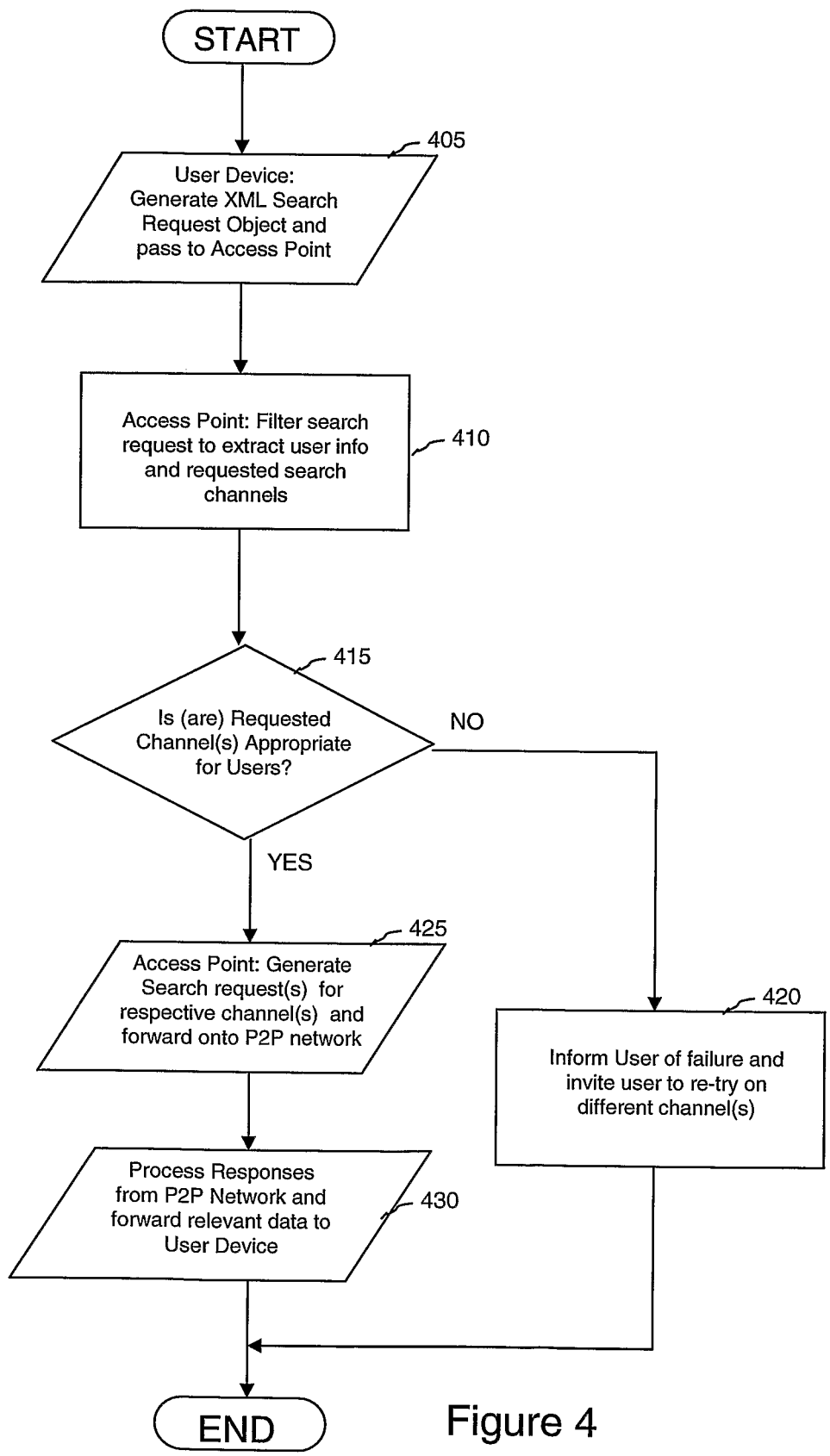
FIG. 4 is a flowchart illustrating the steps required to search for and retrieve information from the peer to peer network of FIG. 1.

With reference now to FIG. 4 (together with FIG. 2), in order for the user of laptop 10 to access a document written to the system, the user interacts with the user GUI and AI running on the laptop 10 to generate a search request. For example, suppose the user wishes to retrieve any text document containing the keyword "badgerman" in the title, written onto a particular channel. In such a case, the user would specify that the search request should look for all documents which are text documents (as opposed to say images, spreadsheets, etc.), contain the keyword "badgerman" in the title and are written onto the specified channel. This information is then used by the user GUI and AI to generate an XML search request which is then passed to an access point (e.g. the access point running on server 20) and, in particular to the ACA of that access point (e.g. ACA 220). This is illustrated in FIG. 4 by step 405.

An example of how such an XML search request as generated by the User GUI and AI 212 would look in the present embodiment is set out below for illustrative purposes:

```
<?xml version="1.0" encoding="UTF-8" ?>
<Search Request>
<UserID>userID</UserID>
<Channel>"General"</Channel>
<Document type>"text"</Document type>
<Title Keywords>"badgerman"</Title Keywords>
</Search Request>
```

When the ACA 220 receives the search request it processes it (in step 410 of FIG. 4) to extract the search criteria and the User identification information. If the search criteria includes a specified channel, it checks if the user is authorised to retrieve documents from the specified channel (at step 415). If it determines that the user is not authorised to retrieve documents from the specified channel, then (at step 420) a message is passed back to the user (via the user GUI and AI 212) informing the user that the search request has failed and, in the present invention, inviting the user to try again specifying a different channel (or channels). (In the present example where the user has specified the General channel to which all users of the system have access, it is determined at step 415 that the requested channel is appropriate for that user and the method proceeds to step 425).

If ACA 220 determines that the requested channels are appropriate for the user, it forwards the search request to the P2P Interface layer 222 which generates a corresponding search request appropriate for the underlying P2P network (this corresponds to step 425 in FIG. 4). In the present embodiment, the search request includes all of the search criteria specified in the original XML search request.

The P2P Interface layer 222 then awaits responses from the P2P network. If it receives a response indicating that the requested document has been found, it requests the respective node of the P2P network to forward the document to it. This document is then passed to the ACA 220 (which decrypts any encrypted portions of the document) and from there forwarded to the user via the User GUI and AI 212 which removes any unnecessary portions of the XML document before presenting it to the user as, in the present embodiment, XML data object 210 (note in alternative embodiments the document could be present as a simple text document containing only the originally created and posted text document, etc.). These processes are represented in FIG. 4 by the step 430.

Second Embodiment

The second embodiment is very similar to the first embodiment described above except instead of using a completely conventional P2P network, the P2P network itself is modified to provide a number of separate channels. In the present embodiment, this is done by "registering" each P2P node with a sub-set of the total number of channels. A node will only process a search request or a request to store data if it corresponds to a channel for which that node is registered. Additionally, each node may maintain a separate set of neighbour peer nodes in respect of each channel to which it is registered, thus effectively creating a different P2P network for each channel.

Figure 5:
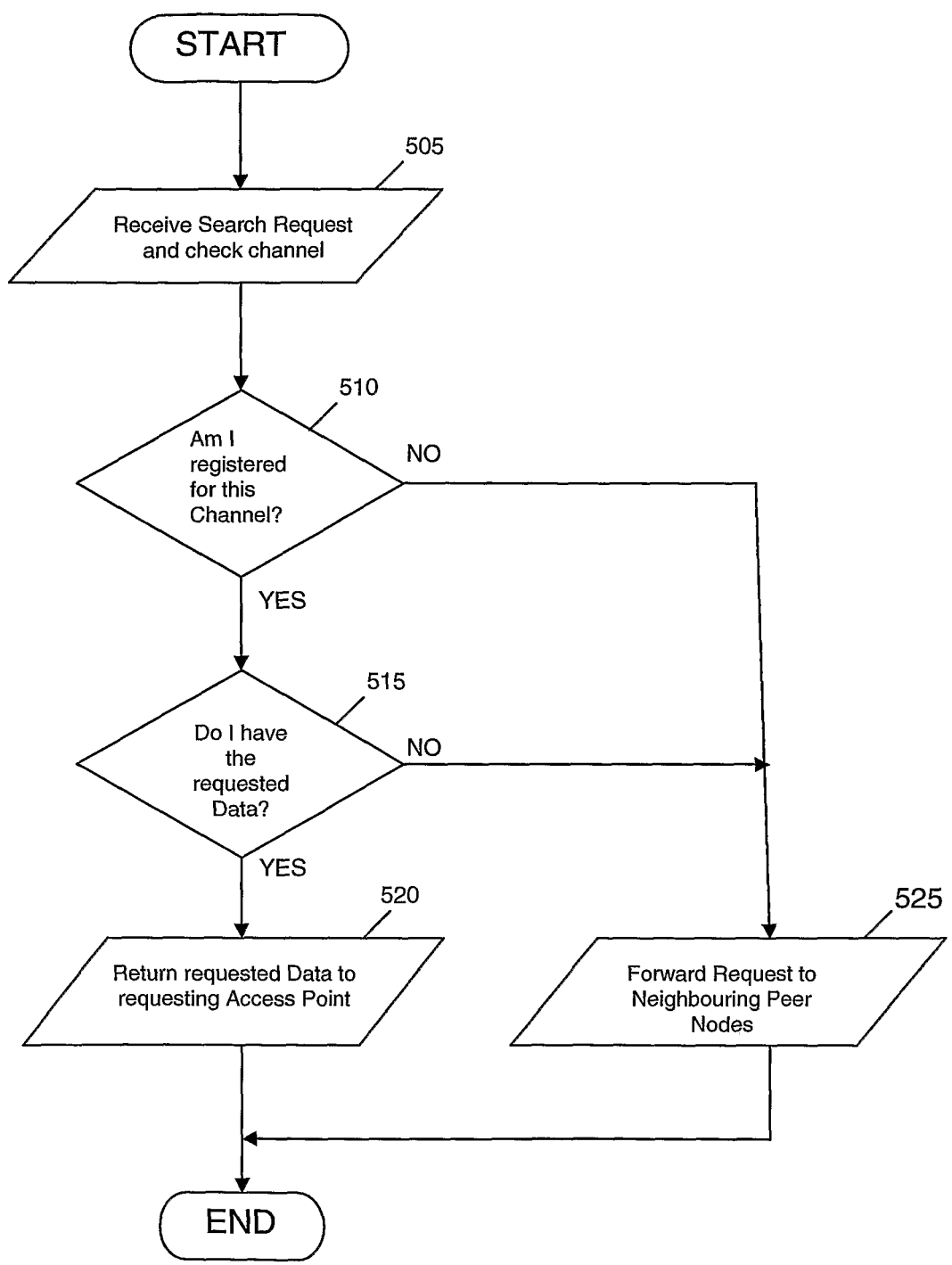
FIG. 5 is a flowchart illustrating the steps taken by an individual peer node to process an incoming search request.

FIG. 5 illustrates how a P2P node operating in accordance with this embodiment behaves when it receives a search request. At step 505 the node receives a search request and checks which channel it relates to (note that in this embodiment if a search request specifies a number of different channels, or if a user has a number of default channels in cases where no channels have been explicitly specified by the user, then the P2P Interface layer 212 generates a number of different search requests, one for each channel on which the search is to be conducted). At step 510 the node checks whether it is registered for the channel determined in step 505.

If the node is registered for the channel specified in the received search request, it checks at step 515 whether or not it has the requested data, if so, at step 520, it informs the P2P Interface layer 222 that it has the requested data and then (provided the P2P Interface layer actually requests the data—which it might not if it has already received the data from another (probably closer) node) forwards the actual data to the P2P Interface layer which passes on the data back to the requesting user (via the ACA 220 and the User GUI and AI 212).

If at either of steps 510 or 515 a negative determination is made (i.e. that the node is not registered for the respective channel or that the node is not storing the requested data) then the method proceeds to step 525 in which the node forwards the search request onto a neighbouring node. Note that if each node is maintaining separate neighbour lists for each channel for which it is registered, step 510 should only generate a negative determination in rare cases of some sort of mistake occurring (in which case it is likely that the request will thereafter be randomly forwarded around to nodes which are not registered for the respective channel until the search request expires—in accordance with standard P2P protocols where a search request has a time-to-live parameter which is decremented each time the search request is forwarded until it reaches zero whereupon the search request is expired and is not further forwarded on—the time-to-live feature is not illustrated in FIG. 5 because it is standard to P2P network protocols).

Note that in order that the P2P Interface Layer 222 is able to launch search requests to an appropriate registered node for any channel, it, or an associated P2P node, needs to behave as a sort of "super" node registered to all channels. This will not be a problem where the number of P2P nodes is much greater than the number of access points. However, where the access points form a significant proportion of the total number of P2P nodes, the advantages of having nodes only registered to a subset of the total number of channels, will start to be lost. In such cases, therefore, it may be advantageous to have the "super" node refuse to store any documents in channels other than a subset of channels (for which it behaves as a normal node). For the channels for which it refuses to store documents, it will always simply forward on any requests straight away (possibly without decrementing the time to live parameter of the request) to a node which it maintains as being a node registered for that channel. Alternative arrangements will present themselves to persons skilled in the art of P2P network design.

ALTERNATIVES

Instead of access points having direct access to the P2P network as a whole, the access points could form a sort of overlay P2P network themselves, with each access point having a limited number of the underlying P2P nodes accessible to it, and each access point forwarding search requests, etc, to other access points when a search amongst its local underlying P2P nodes (and consequently their underlying resources) is unsuccessful.

In such an arrangement, the access points could be registered with only a subset of the total number of available channels. In such an arrangement, the access points could periodically broadcast to other access points the channels for which they are registered so that access points keep a list of which neighbouring access points they should send requests related to different channels to, etc.

Instead of storing a whole document on a single device, the document could be stored on a number of devices to provide redundancy. Furthermore, a document could be split into a number of parts using a suitable erasure code and the various parts could be stored in a distributed manner throughout the devices within the network. An erasure code such as a Tornado code could be used for this purpose. For a general discussion of storing documents in a distributed manner using erasure codes the reader is referred to WO04/059529.

The invention claimed is:

1. A method of an access point in a network of devices to permit data to be stored on the devices and to be searched for and accessed from any of the devices, the network including a definition of a plurality of virtual channels to which documents may be stored and users may be authorized, the method comprising:
providing a mechanism for securely assigning authorizations to users to read or write data from or to specified ones of the channels, the authorizations checked by the access points;
in response to a request to write data into a particular channel, determining that a user making the request is authorized to write data onto the requested channel and associating the data with the requested channel, encrypting the data so that it is not readable except via the access point and sending the data to one of the devices connected to the network to store the data together with the association; and
in response to a request to search for data from a particular channel or group of channels, determining that the user making the request is authorized to read data from the requested channel or group of channels and issuing a corresponding search request or requests to a subset of the devices and, responsive to a determination that the devices store data satisfying the request, decrypting and transmitting the data to the requesting user, and responsive to a determination that the devices do not store data satisfying the request, forwarding the search request to another one or more of the devices.

2. The method as claimed in claim 1 wherein
the access point is implemented using autonomous software agents.

3. The method according to claim 1, wherein
the access point is one of a plurality of access points that collaborate to provide a distributed mechanism for enabling authorizations to be checked.

4. The method according to claim 1, wherein
at least some of the devices store data in response to the data being associated with one of a subset of the total number of defined channels.

5. The method according to claim 1, wherein
in response to a device determining that it is storing data satisfying the request, then the data is transmitted to the requesting user via the requesting access point.

6. A data storage system for permitting data to be stored and selectively accessed by users of the system, the system comprising:
a computer network including a plurality of data processing devices connected to the network, the network including a definition of a plurality of virtual channels to which documents may be stored and users may be authorized, wherein at least some of the devices, when in use, support access point software modules each of which controls access, by users of the system, to the system, such that prior to permitting a user to retrieve data from, or to write data to, the system it can check the identity of the user and determine from which channels of data the user can read data or to which channels of data the user can write data, and wherein
each access point responds to a user request to write data to the data storage system, the request specifying a channel into which data is to be written and checks that the user is authorized to write data belonging to that channel to the system, and responsive to the check, generates an association with the requested channel, encrypting the data so that it is not readable except via the access point and sends the data to one of the devices connected to the network to store the data together with the association, and wherein
each access point responds to a user request to access data from the data storage system, the request specifying a particular channel or group of channels to be searched, checks that the user is authorized to read data associated with the or each respective channel, and responsive to the check, searches for the requested data from the device on which the access point software module is operating and any other associated devices, and in response to a determination that the data can not be found, passes the request on to one or more other ones of the devices for them to search for the requested data.

7. The system according to claim 6 wherein the access points are autonomous software agents.

8. The system according to claim 6, wherein each access point collaborates with one or more other access points to check an authorization of the user in a distributed manner.

9. The system according to claim 6, wherein at least some of the devices store data in response to the data being associated with one of a subset of the total number of defined channels.

10. The system according to claim 6, wherein each device, in response to a search request issued by an access point, if the requested data is found on the device, transmits the data to the requesting user.

11. A non-transitory storage medium storing a computer program which causes a computer to execute an executable code for carrying out a method of an access point in a network of devices to permit data to be stored on the devices and to be searched for and accessed from any of the devices, the network including a definition of a plurality of virtual channels to which documents may be stored and users may be authorized, the method comprising:

providing a mechanism for securely assigning authorizations to users to read or write data from or to specified ones of the channels, the authorizations checked by the access points;

in response to a request to write data into a particular channel, determining that a user making the request is authorized to write data onto the requested channel and associating the data with the requested channel, encrypting the data so that it is not readable except via the access point and sending the data to one of the devices connected to the network to store the data together with the association; and in response to a request to search for data from a particular channel or group of channels, determining that the user making the request is authorized to read data from the requested channel or group of channels and issuing a corresponding search request or requests to a subset of the devices and, responsive to a determination that the devices store data satisfying the request, decrypting and transmitting the data to the requesting user, and responsive to a determination that the devices do not store data satisfying the request, forwarding the search request to another one or more of the devices.

\* \* \* \* \*